(12) United States Patent
Woo et al.

(10) Patent No.: US 8,682,404 B2
(45) Date of Patent: Mar. 25, 2014

(54) SLIDING MODULE FOR SLIDING TYPE PORTABLE COMMUNICATION DEVICE

(75) Inventors: Sung-Gwan Woo, Gyeonggi-do (KR); Hyun-Suk Shin, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 64 days.

(21) Appl. No.: 13/325,156

(22) Filed: Dec. 14, 2011

(65) Prior Publication Data

US 2012/0157174 A1 Jun. 21, 2012

(30) Foreign Application Priority Data

Dec. 20, 2010 (KR) .......................... 10-2010-0130591

(51) Int. Cl.
*H04M 1/00* (2006.01)

(52) U.S. Cl.
USPC ....................................................... 455/575.4

(58) Field of Classification Search
USPC ............... 455/550.1, 575.1, 575.4, 347, 90.3; 248/309.1–316.8; 312/7.1
See application file for complete search history.

(56) References Cited

U.S. PATENT DOCUMENTS

| 2009/0035056 A1* | 2/2009 | Kim et al. ...................... 403/326 |
| 2009/0093282 A1* | 4/2009 | Hwang et al. ............... 455/575.3 |
| 2011/0009169 A1* | 1/2011 | Kim ............................... 455/566 |

FOREIGN PATENT DOCUMENTS

| KR | 10-2008-0017748 A | 2/2008 |
| KR | 10-2008-0092131 A | 10/2008 |

\* cited by examiner

*Primary Examiner* — Christian Hannon
(74) *Attorney, Agent, or Firm* — Cha & Reiter, LLC

(57) ABSTRACT

A sliding module for a sliding-type portable communication device, in which sliding members are integrally formed on both sides of a sliding housing. The sliding module for a sliding-type portable communication device preferably includes a body housing and a sliding housing sliding while facing the body housing, and a sliding guide portion provided in the body housing. The sliding guide portion includes guide members integrally formed on both sides of the guide portion and sliding members integrally formed on both sides of the sliding housing to be slidably coupled with the guide members.

18 Claims, 8 Drawing Sheets

SLIDING MODULE FOR SLIDING TYPE PORTABLE COMMUNICATION DEVICE

CLAIM OF PRIORITY

This application claims the benefit under 35 U.S.C. §119 (a) of a Korean Patent Application filed in the Korean Intellectual Property Office on Dec. 20, 2010 and assigned Serial No. 10-2010-0130591, the entire disclosure of which is hereby incorporated by reference in its entirety.

BACKGROUND OF THE INVENTION

1. Field of the Invention

The present invention generally relates to a sliding module, and more particularly, to a sliding module for a sliding-type portable communication device in which two housings are coupled to each other in a manner that one housing longitudinally moves to be opened or closed with respect to the other while the housings face each other.

2. Description of the Related Art

Generally, a "portable communication device" refers to an apparatus which a user can carry with him/her to perform wireless communication with another party, either by voice or, for example, text messages. Conventional portable communication devices may be classified into various types according to their appearance, such as bar-type terminals, flip-type terminals, folder-type terminals, etc.

A bar-type terminal has a single housing shaped like a candy bar. A flip-type terminal has a flip which is rotatably combined with a bar-shaped housing by a hinge device. A folder-type terminal has a folder pivotably coupled to a single bar-shaped housing by a hinge device.

In addition, portable communication devices may be classified into rotation-type terminals and sliding-type terminals according to different ways of opening and closing the terminals.

For example, in a rotation-type terminal, two housings are coupled to each other in such a manner that one housing rotates to be opened or closed with respect to the other while the housings face each other.

Moreover, in a sliding-type terminal, two housings are coupled to each other in such a manner that one housing longitudinally moves to be opened or closed with respect to the other while the housings face each other. These variously-classified portable communication devices can be easily understood by those skilled in the art.

As shown in the exploded view of FIG. 1, a sliding module 1 for a sliding-type portable communication device may be structured such that when viewed from a main body 2 includes a keypad with a plurality of keys 2a and a microphone 2b, a sliding portion 3 that slidably extends from the footprint of the main body by about ½ of the length of the main body 2 to open the device for access of the keys 2a or retracts back to the footprint of the main body when closed. Generally, a 3×4 keypad may be installed in the main body 2, and a speaker device 3a and a Liquid Crystal Display (LCD) module 3b may be installed on a front surface of the sliding portion 3.

As shown in FIGS. 1 and 2, the conventional sliding module 1 for the sliding-type portable communication device includes the main body 2, the sliding portion 3 sliding a predetermined length on the main body 2, and a plurality of torsion springs 4 arranged between the sliding portion 3 and the main body 2 to provide an elastic force for allowing the sliding portion 3 to slide up or down. Between the main body 2 and the sliding portion 3 is also provided a guide portion 6 for guiding the sliding portion 3 along the main body 2 when in motion.

The guide portion 6 includes a main plate 6a having a pair of guide rails 6c, and a sliding plate 6b having a guide member 6d.

As shown in FIG. 2, the thickness of the sliding-type portable communication device is determined according to mounting positions of the LCD module 3b and the sliding module 1. In particular, a smart phone and a portable communication device sliding horizontally have to include the large-size LCD module 3b in the sliding portion 3, such that the sliding module 1 is provided under the LCD module 3b.

However, the conventional sliding module for the sliding-type portable communication device is positioned outside the large-size LCD module, and the sliding module has the sliding plate in the sliding portion thereof. As a result, in the conventional sliding module the size and thickness of the sliding plate cannot be reduced from its present thickness, thereby increasing the overall size of the communication device and thus hindering the slimness of the communication device.

In addition, the conventional sliding module for the sliding-type portable communication device has a long length due to the large-size LCD module, and thus the sliding plate also moves downward together with the sliding of the sliding portion, causing interference between neighboring components, which leads to scratches along the surface, and the LCD module and the sliding portion are highly likely to be damaged in case where the communication device is dropped.

Moreover, since the sliding portion of the conventional sliding module has to include the sliding plate, the number of components increases, increasing the unit cost of a product.

Therefore, there is a long-felt need in the art for a device in which a sliding plate is formed integrally on both sides of a sliding housing to reduce the thickness of a sliding-type portable communication device.

SUMMARY OF THE INVENTION

Accordingly, an exemplary aspect of the present invention is to provide a sliding module for a sliding-type portable communication device, in which sliding members are integrally formed on both sides of a sliding housing to reduce the overall thickness of a product, thereby contributing to a slimmer product than known heretofore.

Another exemplary aspect of the present invention is to provide a sliding module for a sliding-type portable communication device, in which sliding members are integrally formed on both sides of a sliding housing to reduce the number of components of a product, and thereby improves the efficiency of the assembly processes and reduces a manufacturing cost of the product.

Moreover, another exemplary aspect of the present invention is to provide a sliding module for a sliding-type portable communication device, in which sliding members are integrally formed on both sides of a sliding housing to construct a large-size display unit, thereby improving the use efficiency of a product.

Furthermore, another exemplary aspect of the present invention is to provide a sliding module for a sliding-type portable communication device, in which the sliding module is formed of metal and reinforced plastics, thereby improving the rigidity of a product and thus preventing a large-size display unit from being damaged.

According to an exemplary aspect of the present invention, there is provided a sliding module for a sliding-type portable communication device, which preferably includes a body housing and a sliding housing sliding while facing the body housing, and a sliding guide portion provided in the body housing, the sliding guide portion comprising guide members integrally formed on both sides thereof and sliding members integrally formed on both sides of the sliding housing to be slidably coupled with the guide members.

BRIEF DESCRIPTION OF THE DRAWINGS

The above and other features and advantages of an exemplary embodiment of the present invention will become more apparent to a person of ordinary skill in the art from the following detailed description taken in conjunction with the accompanying drawings, in which.

DETAILED DESCRIPTION

Figure 1:
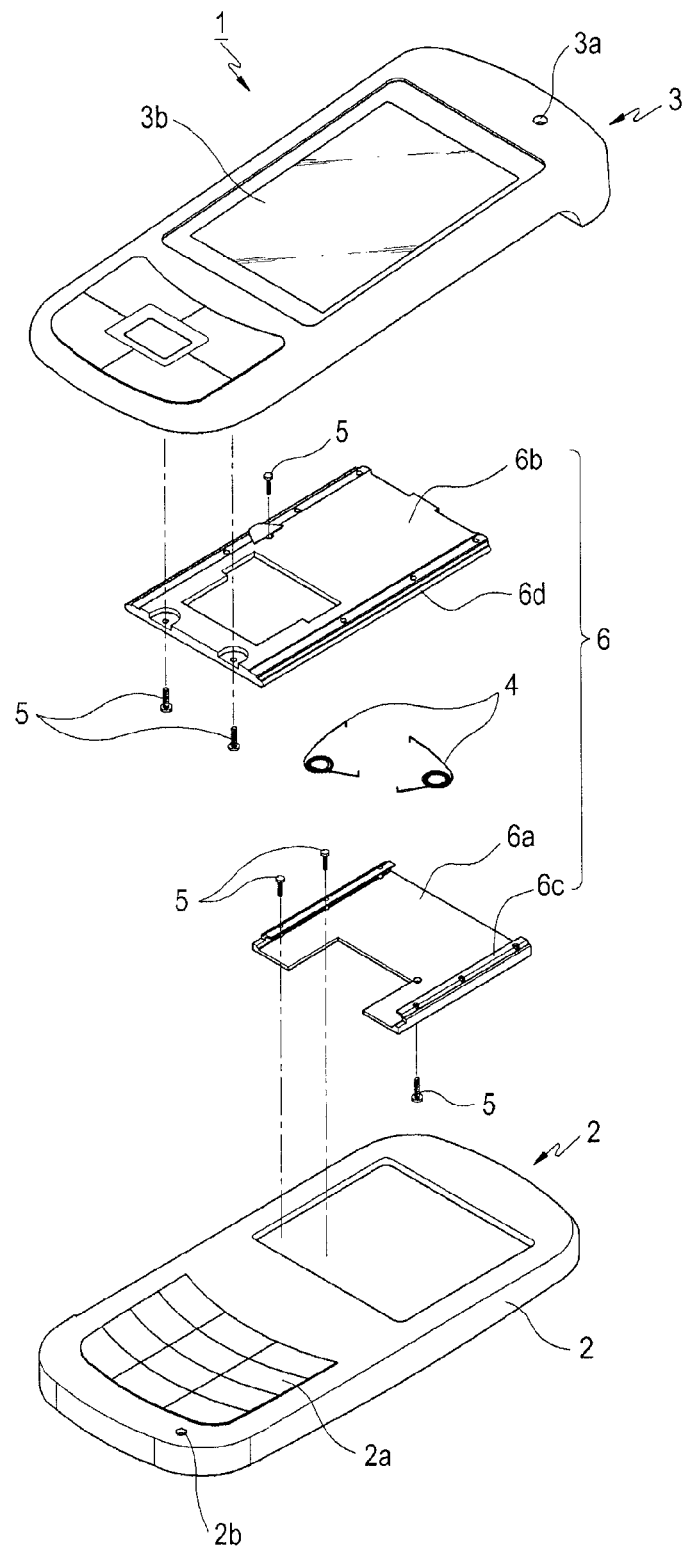
FIG. 1 is an exploded perspective view of a conventional sliding module for a sliding-type portable communication device.
Figure 2:
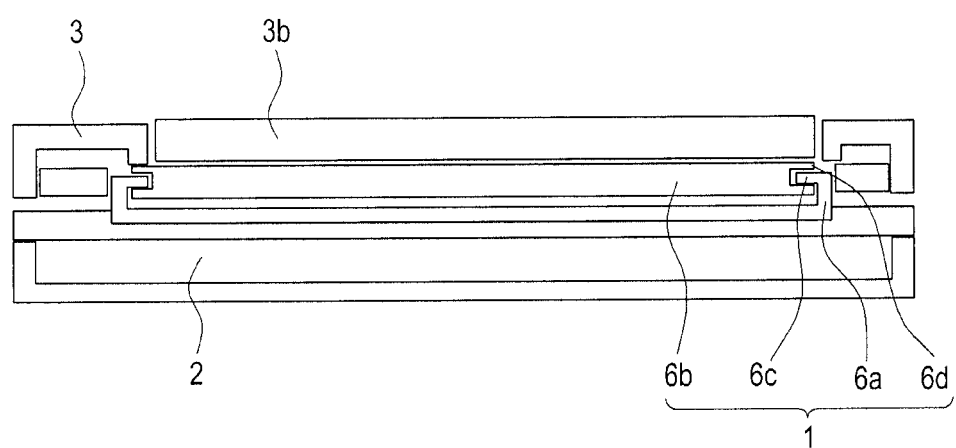
FIG. 2 is a side view showing a coupled state of a conventional sliding module for a sliding-type portable communication device.

Hereinafter, an exemplary embodiment of the present invention will be described in detail with reference to the accompanying drawings. The embodiment disclosed in the specification and structures shown in the drawings have been provided for illustrative purposes to permit a person of ordinary skill in the art to practice the claimed invention. A person of ordinary skill in the art should understand that many variations and substitutions of the exemplary embodiment of the present invention shown and described herein will be within the spirit of the invention and the scope of the appended claims.

Referring now to FIGS. 3 through 6, a sliding module 100 for a sliding-type portable communication device according to an exemplary embodiment of the present invention preferably includes a body housing 110, a sliding housing 120, a sliding guide portion 130, and sliding members 140. The body housing 110 faces a bottom surface of the sliding housing 120 to allow sliding of the sliding housing 120, and the sliding housing 120 is provided on a top surface (upper surface) of the body housing 110 to slide with respect to the body housing 110 while facing the body housing 110. The body housing may comprise an RF communication unit, microprocessor/processor controller, non-transitory memory, an antenna, speaker, etc. The RF communication unit preferably establishes a communication channel for a voice call and a communication channel for transmitting data, such as text, video data, etc., under the control of the controller. In other words, the RF communication unit establishes a voice call channel, a data communication channel, and a video call channel with an external mobile communication system. To this end, the RF communication unit preferably includes an RF transmitter for up-converting the frequency of signals to be transmitted and amplifying the signals and an RF receiver for low-noise amplifying received RF signals and down-converting the frequency of the received RF signals. The RF communication unit may include a subunit for communication via Bluetooth, for example, in addition to the RF transceiving capability via a base station. microprocessor/controller may process MP3 signals, for example. The electronics in the body housing and in the sliding housing may communicate via a flexible cable.

As shown in FIGS. 3 and 7 through 12, guide members 131 are formed on both sides of the sliding guide portion 130 to be slidably coupled with the sliding members 140 (refer to FIGS. 8,9, 11 and 12), and the sliding guide portion 130 is coupled to the body housing 110 to allow sliding of the sliding members 140.

The sliding members 140 are integrally formed on both sides of the sliding housing 120 to be slidably coupled with the guide members 131.

With continued reference to FIGS. 3 and 7 through 12, the guide members 131 are formed with guide rails at their edge to be slidably coupled with the sliding members 140.

Figure 10:
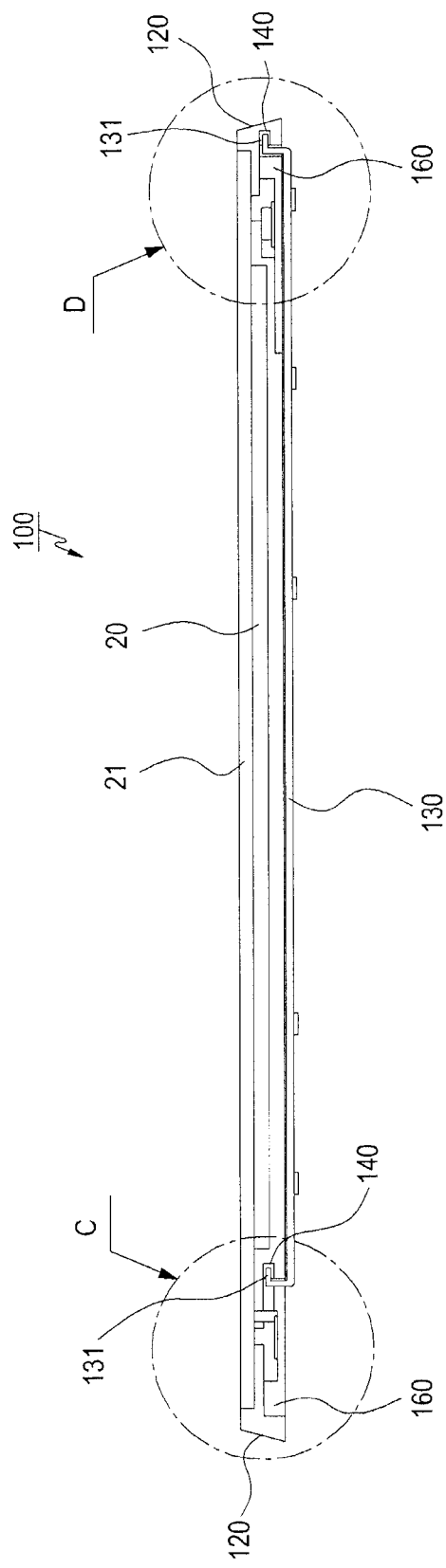
FIG. 10 is a side view showing a coupled state of a sliding module for a sliding-type portable communication device according to an exemplary embodiment of the present invention.
Figure 11:
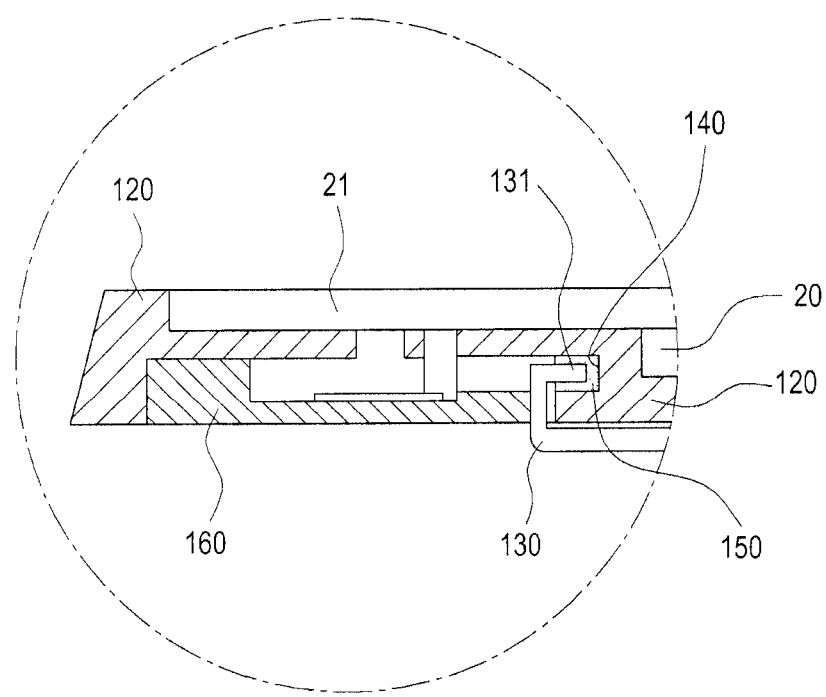
FIG. 11 is an enlarged side cross-sectional perspective view of a portion C of FIG. 10.
Figure 12:
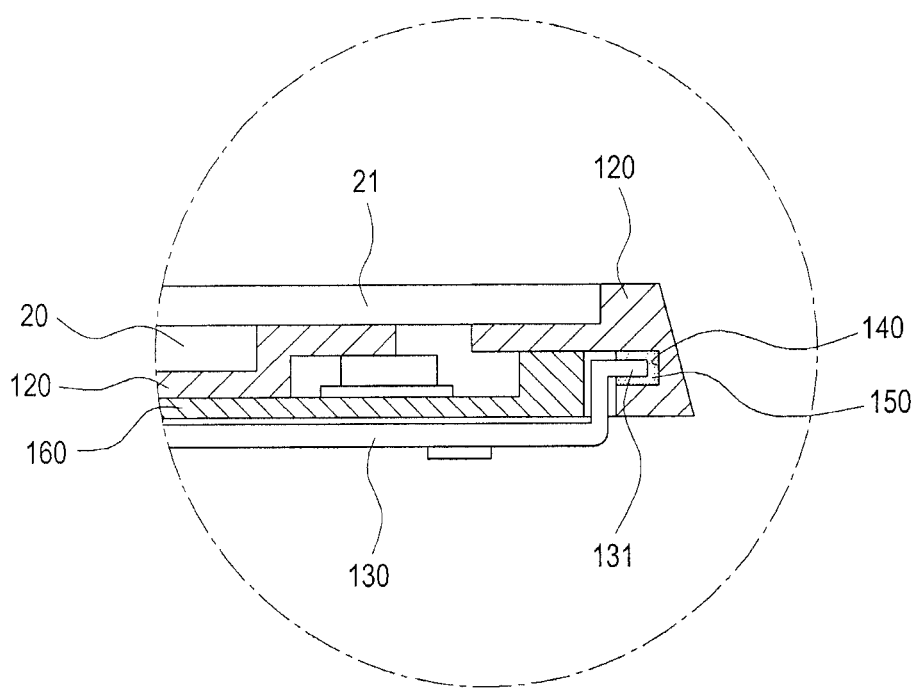
FIG. 12 is an enlarged side cross-sectional perspective view of a portion D of FIG. 10.

As shown in FIGS. 10 through 12, the guide members 131 are formed in the shape of "¬" (L-shaped) and are equally disposed along a longitudinal direction of the body housing 110. However, the person of ordinary skill in the art understands and appreciates that the claimed invention is not limited to L-shaped guide members.

Figure 3:
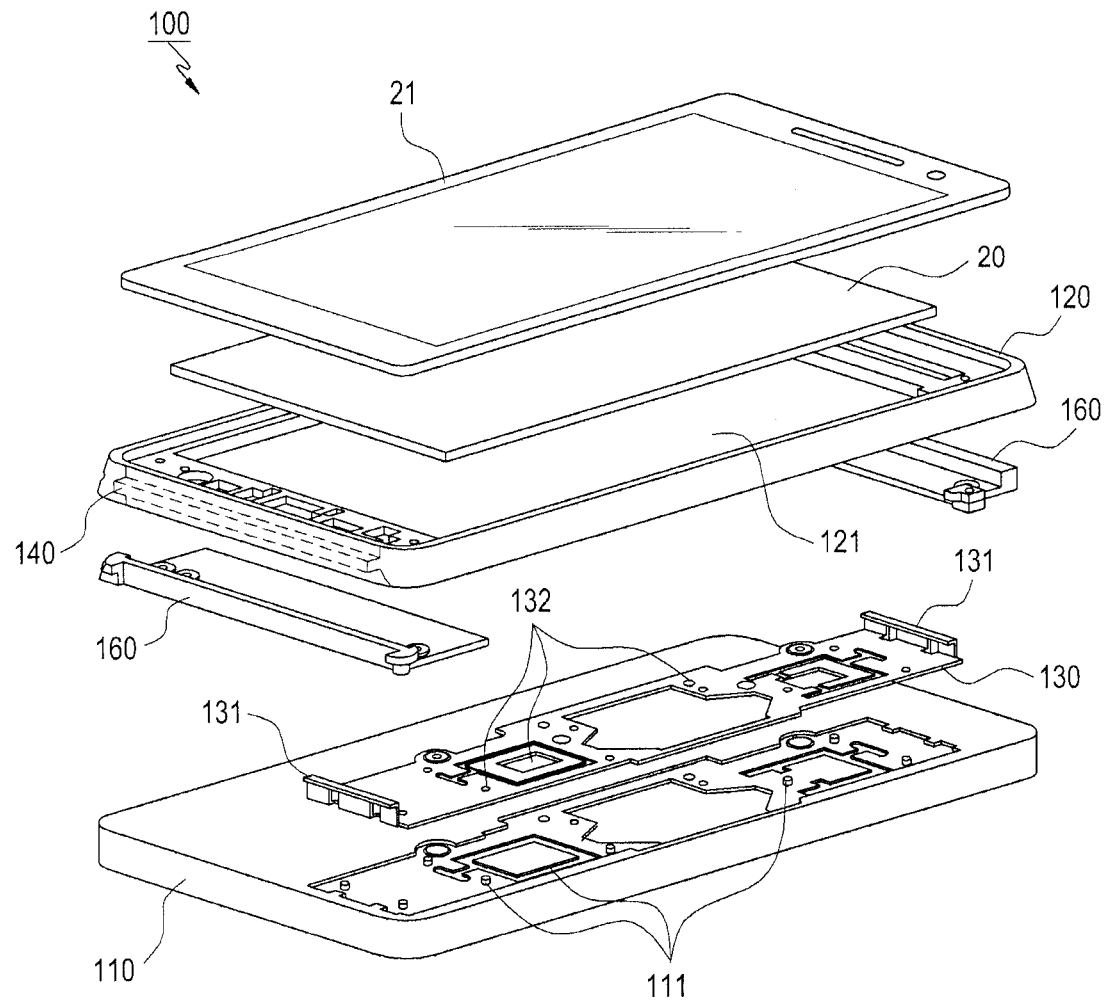
FIG. 3 is an exploded perspective view of a sliding module for a sliding-type portable communication device according to an exemplary embodiment of the present invention.

FIG. 3 shows the sliding guide portion 130 is formed as a plate.

Figure 4:
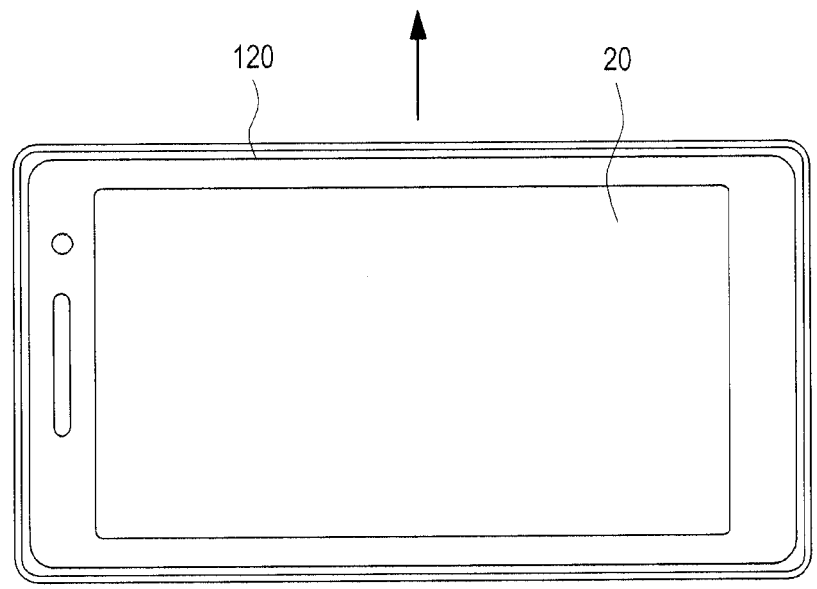
FIG. 4 is a plan view showing a pre-operation (before-operation) state of a sliding module for a sliding-type portable communication device according to an exemplary embodiment of the present invention.

FIG. 4 shows that in the sliding guide portion 130 are formed at least one coupling portions 132 to be insertedly coupled with at least one protrusions and grooves 111 formed in the body housing 110. The coupling portions 132 preferably include both coupling protrusions and coupling holes.

As shown in FIGS. 6 through 12, the sliding members 140 include guide grooves that slidably couple with the guide members 131.

Referring to FIGS. 6 and 10 through 12, the sliding members 140 are equally disposed along a longitudinal direction of the sliding housing 120 so as to be correspondingly coupled with the guide members 131.

FIGS. 8, 9, 11 and 12 show that the inner sides of the sliding members 140 are provided friction reducing members 150 for reducing friction generated with the guide members 131 during sliding of the sliding housing 120.

Figure 8:
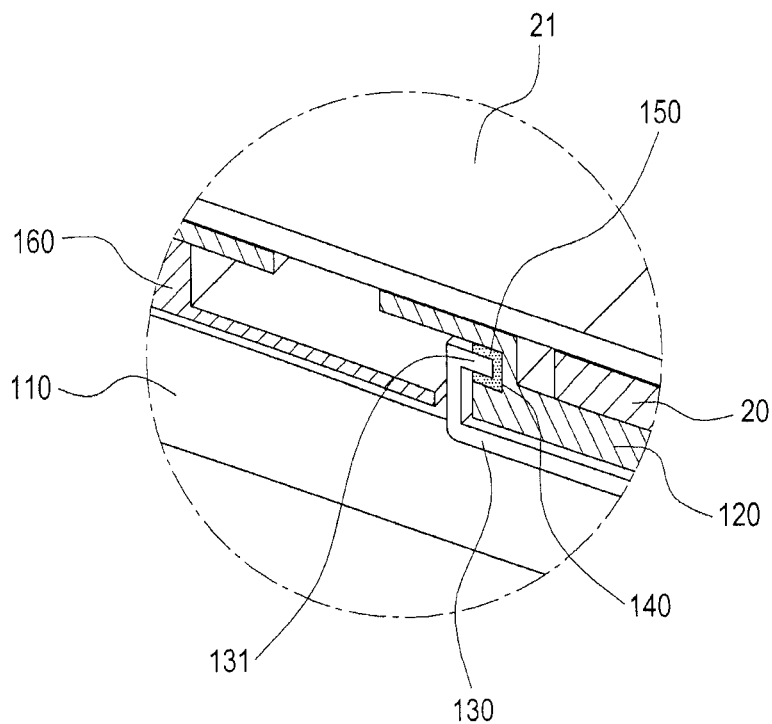
FIG. 8 is an enlarged side cross-sectional perspective view of a portion A of FIG. 7.
Figure 9:
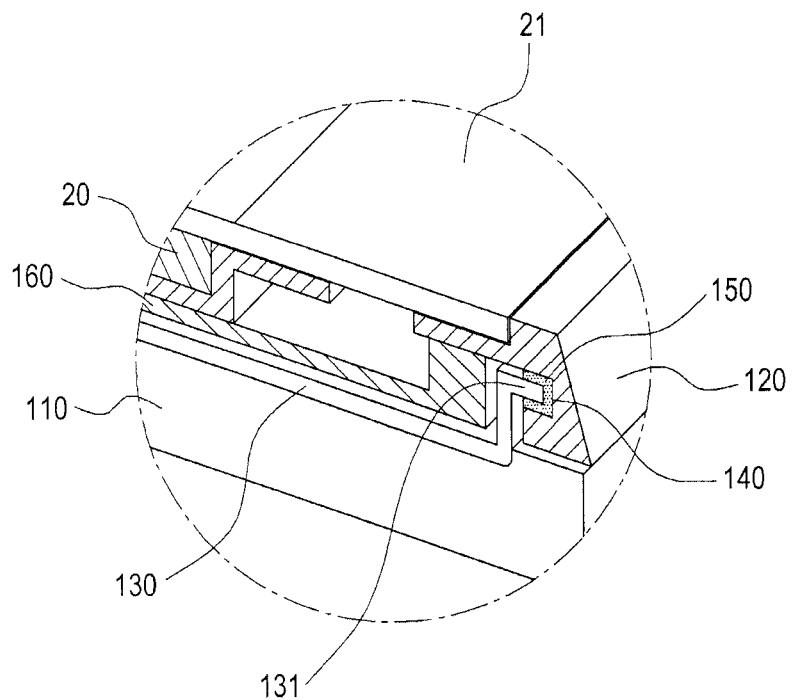
FIG. 9 is an enlarged side cross-sectional perspective view of a portion B of FIG. 7.

With particular references to FIGS. 3, 8 and 9, on the bottom surface of the sliding housing 120 are provided support reinforcing portions 160 for reinforcing the rigidity of the sliding housing 120 and supporting guided movement of the sliding members 140 along the guide members 131.

The sliding guide portion 130 and the sliding members 140 are preferably formed of metal and/or reinforced plastics. However, the sliding guide portion 130 and the sliding members 140 may also be other materials, such as reinforced fiber, titanium, aluminum, etc.

Referring to FIG. 3, in the sliding housing 120 is formed a receiving recess 121 for receiving a large-size display unit 20 and other components (not shown) of the portable communication device, such as a keypad, buttons, a Printed Circuit Board (PCB), and so forth. The display unit 20 may comprise a touch screen. They display unit may occupy a majority of the receiving recess.

Figure 5:
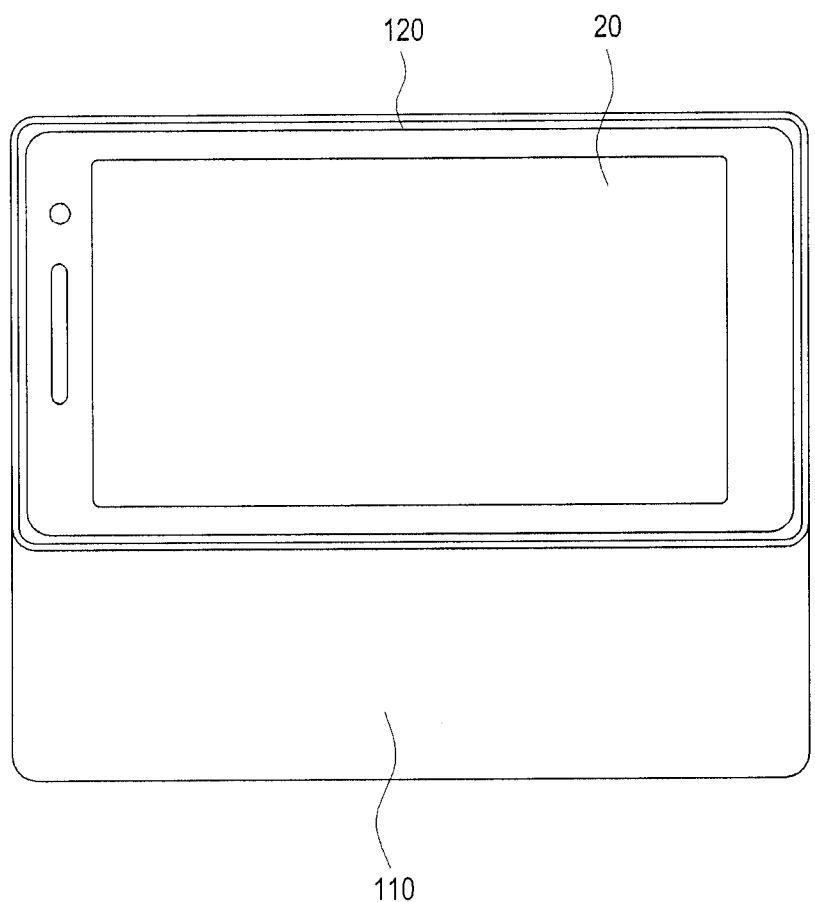
FIG. 5 is a plan view showing a post-operation (after-operation) state of a sliding module for a sliding-type portable communication device according to an exemplary embodiment of the present invention.
Figure 6:
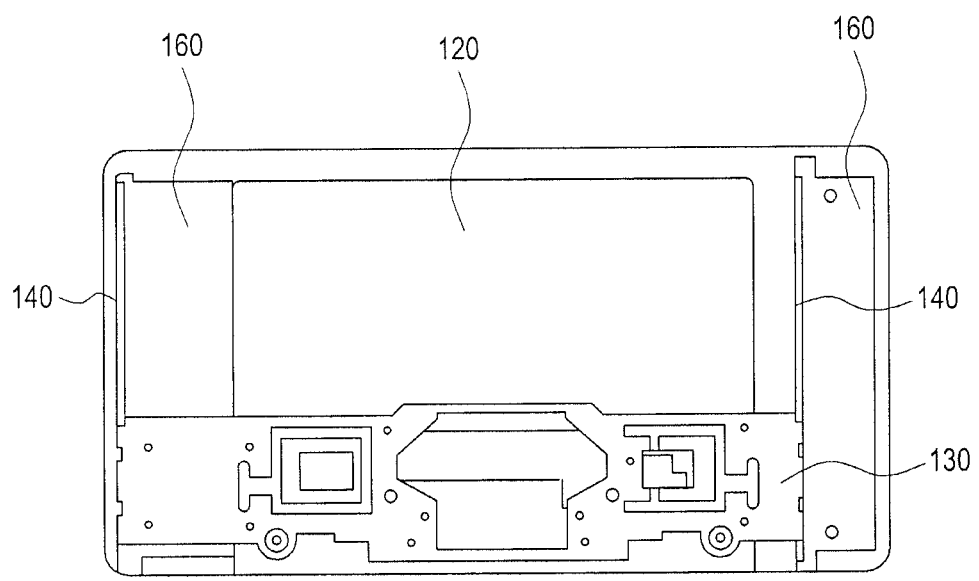
FIG. 6 is an internal plan view showing a post-operation state of a sliding module for a sliding-type portable communication device according to an exemplary embodiment of the present invention.
Figure 7:
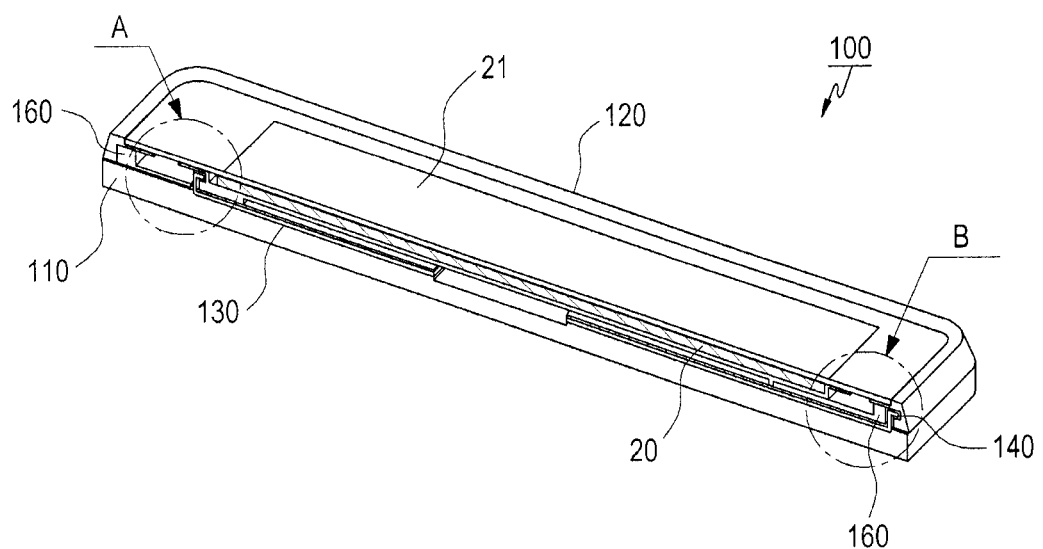
FIG. 7 is a side cross-sectional perspective view showing a coupled state of a sliding module for a sliding-type portable communication device according to an exemplary embodiment of the present invention.

FIGS. 3 through 5 show that the sliding housing 120 is adapted to slide perpendicular to the longitudinal direction of the body housing 110.

In the aforementioned descriptions the sliding module 100 according to an exemplary embodiment of the present invention is applied to a sliding-type portable communication device as a representative application of the claimed invention. However, a person of ordinary skill in the art should appreciate that application of the sliding module 100 is not limited to the sliding-type portable communication device and the sliding module 100 may be applied to various types of products, e.g., a terminal sliding vertically or horizontally, a terminal sliding horizontally, and so forth.

Examples of the sliding-type portable communication device according to the examples embodiment of the present invention may include not only devices such as mobile communication terminals operating according to communication protocols corresponding to various communication systems, but also any information communication apparatuses and multimedia apparatuses such as Portable Multimedia Players (PMPs), MP3 players, navigation systems, game consoles, notebooks, advertising boards, TVs, digital broadcasting players, Personal Digital Assistants (PDAs), smart phones, tablet computers, and so forth, and their application apparatuses.

With reference to FIGS. 3 through 12, a description will now be made of an operating process of the above-structured sliding module 100 for the sliding-type portable communication device according to an exemplary embodiment of the present invention.

As shown in FIGS. 3 through 12, the sliding module 100 for the sliding-type portable communication device preferably includes the body housing 110, the sliding housing 120, the sliding guide portion 130, and the sliding members 140.

Herein, the sliding-type portable communication device is assumed to slide horizontally as shown in FIGS. 4 and 5.

As shown in FIGS. 3 and 8 through 12, the guide members 131 are integrally formed on both sides of the sliding guide portion 130.

As shown in FIG. 4, in the sliding guide portion 130 are formed at least one coupling portions 132 which are insertedly coupled with the at least one protrusions and grooves 111 formed in the body housing 110.

As shown in FIGS. 3 and 7 through 12, on the bottom surface of the sliding housing 120 are provided the support reinforcing portions 160 for reinforcing the rigidity of the sliding housing 120 and supporting guided movement of the sliding members 140 along the guide members 131.

In this state, as shown in FIGS. 3 through 12, the sliding members 140 integrally formed on both sides of the sliding housing 120 are slidably coupled to the guide members 131 integrally formed on both sides of the sliding guide portion 130. The large-size display unit 20 is preferably disposed in the receiving recess 121 formed in the sliding housing 120, and a window portion 21 is disposed on the large-size display unit 20.

As shown in FIGS. 7 through 11, the guide members 131 are formed in the shape of "¬" and are equally disposed along a longitudinal direction of the body housing 110.

As shown in FIGS. 8 through 11, the guide members 131 in the shape of "¬" are slidably coupled to the sliding members 140. The sliding members 140 are also equally disposed in the longitudinal direction of the sliding housing 120 to be coupled with the guide members 131.

In this state, once the sliding housing 120 slides with respect to the body housing 110 as shown in FIG. 5, the sliding members 140 integrally formed on the sliding housing 120 also slide by being guided along the guide members 131.

As shown in FIGS. 5 and 7 through 12, the sliding members 140 integrally formed on both sides of the sliding housing 120 slide along the guide members 131 integrally formed on both sides of the sliding guide portion 130, respectively.

In this state, as shown in FIGS. 8 and 10, the friction reducing members 150 are provided in the inner sides of the sliding members 140 to reduce friction between the sliding members 140 and the guide members 131 of the sliding guide portion 130 during sliding of the sliding members 140.

Herein, as shown in FIG. 5, the sliding housing 120 moves and thus opens (i.e. provides access) to the body housing 110.

To close (i.e. cover) the body housing 110 as shown in FIG. 4, the sliding housing 120 slides again with respect to the body housing 110 to the home position.

As shown in FIGS. 4 and 7 through 12, the sliding members 140 integrally formed on both sides of the sliding housing 120 also slide by being guided along the guide members 131 integrally formed on both sides of the sliding guide portion 130.

As such, by forming the sliding members 140 integrally on both sides of the sliding housing 120, the thickness of the body housing 110 and the sliding housing 120 is reduced, thus contributing to the slimness of a product, and the number of components is also reduced, thus improving the efficiency of assembly processes and reducing the manufacturing cost. Moreover, by providing the large-size display unit 20 and forming the sliding guide portion 130 and the sliding members 140 of metal and reinforced plastics, the rigidity of the product is improved, thus preventing the large-size display unit 20 from being damaged.

A person of ordinary skill in the art should appreciate that a sliding module for a sliding-type portable communication device according to the present invention described above is not limited by the foregoing exemplary embodiments and drawings, and various substitutions, modifications, and changes can be made in terminals having various exterior shapes such as a sliding type, a swing type, a waterproof terminal, and so forth.

The portable communication device having a sliding module according the present invention can be realized in hardware or as software or computer code that can be stored in a non-transitory recording medium such as a CD ROM, a RAM, thumbnail drive, a floppy disk, a flash storage, a hard disk, or a magneto-optical disk or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

What is claimed is:

1. A sliding module for a sliding-type portable communication device which comprises a body housing and a sliding housing sliding that faces the body housing and is slidably disposed with respect to the body housing, the sliding module comprising:
  a sliding guide portion provided at least partially within the body housing, the sliding guide portion comprising guide members integrally formed on both sides thereof wherein both of the guide members extend along a longitudinal direction of the sliding housing and face in a same direction toward a same side of the body housing; and
  sliding members integrally formed on both sides of the sliding housing being slidably coupled with the guide members.

2. The sliding module of claim 1, wherein the guide members are formed with guide rails, and wherein
  the guide members are substantially L-shaped and are equally disposed along a longitudinal direction of the body housing.

3. The sliding module of claim 1, wherein the sliding guide portion is formed in the shape of a plate, and wherein in the sliding guide portion is formed of at least one coupling portions which are insertedly coupled with at least one of protrusions and grooves formed in the body housing, and
  wherein the coupling portions comprise coupling protrusions and coupling holes.

4. The sliding module of claim 1, wherein the sliding members comprise guide grooves that receive the guide rails of the guide members, and wherein
  the sliding members are equally disposed in a longitudinal direction of the sliding housing for being correspondingly coupled with the guide members.

5. The sliding module of claim 1, further comprising friction reducing members arranged at inner sides of the sliding members for reducing friction between the sliding members and the guide members during sliding of the sliding housing.

6. The sliding module of claim 1, further comprising support reinforcing portions arranged at a bottom surface of the sliding housing for reinforcing a rigidity of the sliding housing and supporting guided movement of the sliding members along the guide members.

7. The sliding module of claim 1, wherein the sliding guide portion and the sliding members are formed of at least one of metal and reinforced plastics.

8. The sliding module of claim 1, wherein a receiving recess is formed in the sliding housing to receive a display unit of the portable communication device and additional components of the portable communication device.

9. The sliding module of claim 1, wherein the sliding housing slides in perpendicular to a longitudinal direction of the body housing.

10. A portable communication device including
  a display;
  a sliding housing having a recessed portion for receiving at least the display;
  a body housing including an RF communication unit, controller and memory therein, said body housing having a top surface facing a bottom surface of the sliding housing;
  a sliding guide portion provided in the body housing, the sliding guide portion comprising guide members integrally formed along both sides thereof wherein both of the guide members extend along a longitudinal direction of the sliding housing and face in a same direction toward a same side of the body housing; and
  wherein sliding members integrally formed on both sides of the sliding housing being slidably coupled with the guide members.

11. The portable communication device according to claim 10, wherein the display comprises a touchscreen.

12. The portable communication device according to claim 11, wherein the touchscreen occupies a majority of the recessed portion of the sliding housing.

13. The portable communication device according to claim 10, further comprising a keypad arranged in the recessed portion of the sliding housing.

14. The portable communication device according to claim 10, wherein a keypad is arranged along an upper surface of the body housing.

15. The portable communication device according to claim 10 comprising an MP3 player in the body housing.

16. The portable communication device according to claim 10, wherein the sliding housing is configured for sliding in at least one of a vertical or horizontal direction relative to the body housing.

17. The portable communication device according to claim 10, wherein
  the guide members are substantially L-shaped and are equally disposed along a longitudinal direction of the body housing.

18. The portable communication device of claim 10, wherein the sliding guide portion is formed in the shape of a plate, and wherein in the sliding guide portion is formed of at least one coupling portions which are insertedly coupled with at least one of protrusions and grooves formed in the body housing, and wherein the coupling portions comprise coupling protrusions and coupling holes.

* * * * *

UNITED STATES PATENT AND TRADEMARK OFFICE
CERTIFICATE OF CORRECTION

PATENT NO. : 8,682,404 B2
APPLICATION NO. : 13/325156
DATED : March 25, 2014
INVENTOR(S) : Sung-Gwan Woo et al.

Page 1 of 1

It is certified that error appears in the above-identified patent and that said Letters Patent is hereby corrected as shown below:

In the Claims:

Column 7, Claim 1, Line 14 should read as follows:
--...housing that faces the...--

Column 8, Claim 15, Lines 36-37 should read as follows:
--...according to claim 10, comprising...--

Column 8, Claim 18, Line 49 should read as follows:
--...and wherein the sliding...--

Signed and Sealed this
Seventeenth Day of June, 2014

Michelle K. Lee
*Deputy Director of the United States Patent and Trademark Office*